(12) United States Patent
Penn

(10) Patent No.: US 10,259,362 B2
(45) Date of Patent: Apr. 16, 2019

(54) SEAT TRIM MEMBERS, SEAT TRIM ASSEMBLIES, AND SEAT ASSEMBLIES

(71) Applicant: Lear Corporation, Southfield, MI (US)

(72) Inventor: Carl Penn, Coventry (GB)

(73) Assignee: Lear Corporation, Southfield, MI (US)

( * ) Notice: Subject to any disclaimer, the term of this patent is extended or adjusted under 35 U.S.C. 154(b) by 196 days.

(21) Appl. No.: 15/252,370

(22) Filed: Aug. 31, 2016

(65) Prior Publication Data

US 2018/0055242 A1 Mar. 1, 2018

(51) Int. Cl.
*A47C 7/02* (2006.01)
*B60N 2/58* (2006.01)

(52) U.S. Cl.
CPC ......... *B60N 2/5891* (2013.01); *B60N 2/5825* (2013.01)

(58) Field of Classification Search
CPC .... B60N 2/6018; B60N 2/5825; B60N 2/682; B60N 2/5816; A47C 31/023
USPC .... 297/452.38, 452.1, 452.18, 378.1, 452.19
See application file for complete search history.

(56) References Cited

U.S. PATENT DOCUMENTS

| | | | |
|---|---|---|---|
| 5,685,612 A * | 11/1997 | MacDonald | B60N 2/366 248/503.1 |
| 5,700,058 A * | 12/1997 | Balagurumurthy | B60N 2/20 296/63 |
| 5,716,100 A * | 2/1998 | Lang | B60N 2/242 297/378.1 |
| 7,073,861 B2 * | 7/2006 | Ichikawa | B60N 2/3013 297/378.1 |
| 7,243,998 B2 | 7/2007 | Fourrey et al. | |
| 7,328,947 B2 * | 2/2008 | Laporte | B60N 2/2809 297/254 |
| 7,758,129 B2 * | 7/2010 | Maruno | B60N 2/015 296/65.09 |
| 8,678,996 B2 * | 3/2014 | Deegan | A61F 2/0045 600/30 |
| 8,845,020 B2 | 9/2014 | Sei et al. | |
| 9,039,081 B2 * | 5/2015 | Arefi | B60N 2/686 297/188.12 |
| 9,937,822 B2 * | 4/2018 | Pino | B60N 2/2245 |
| 2003/0020319 A1 * | 1/2003 | Adams | A47C 5/12 297/452.18 |
| 2011/0187168 A1 * | 8/2011 | Zorine | B60N 2/3013 297/248 |
| 2012/0187738 A1 | 7/2012 | Gross et al. | |

(Continued)

FOREIGN PATENT DOCUMENTS

| | | |
|---|---|---|
| CN | 203496724 U | 3/2014 |
| CN | 204077453 U | 1/2015 |

(Continued)

*Primary Examiner* — Chi Q Nguyen
(74) *Attorney, Agent, or Firm* — Brooks Kushman P.C.

(57) ABSTRACT

A seat trim assembly includes first and second seat trim members sized to be received upon a cross member of a seat back frame, and to each support a portion of a back of an occupant. The first seat trim member includes a first fastener arrangement. The second seat trim member includes a second fastener arrangement sized to engage the first fastener arrangement. The first fastener arrangement is oriented so that the first seat trim member can only be assembled to the cross member at an angle relative to the second seat trim member that is radially offset about the cross member from a fully assembled orientation.

7 Claims, 3 Drawing Sheets

(56) References Cited

U.S. PATENT DOCUMENTS

| | | | | |
|---|---|---|---|---|
| 2013/0341951 A1* | 12/2013 | Asai | ............... | B60N 2/015 296/63 |
| 2014/0197670 A1* | 7/2014 | Freijy | ............... | B60N 2/366 297/354.12 |
| 2015/0130252 A1 | 5/2015 | Werner et al. | | |

FOREIGN PATENT DOCUMENTS

| | | |
|---|---|---|
| CN | 204109853 U | 1/2015 |
| CN | 204309645 U | 5/2015 |
| CN | 204323132 U | 5/2015 |
| FR | 2899163 B1 | 1/2009 |
| KR | 101529246 B1 | 6/2015 |
| WO | 0204245 A1 | 1/2002 |
| WO | 2015032944 A1 | 3/2015 |

\* cited by examiner

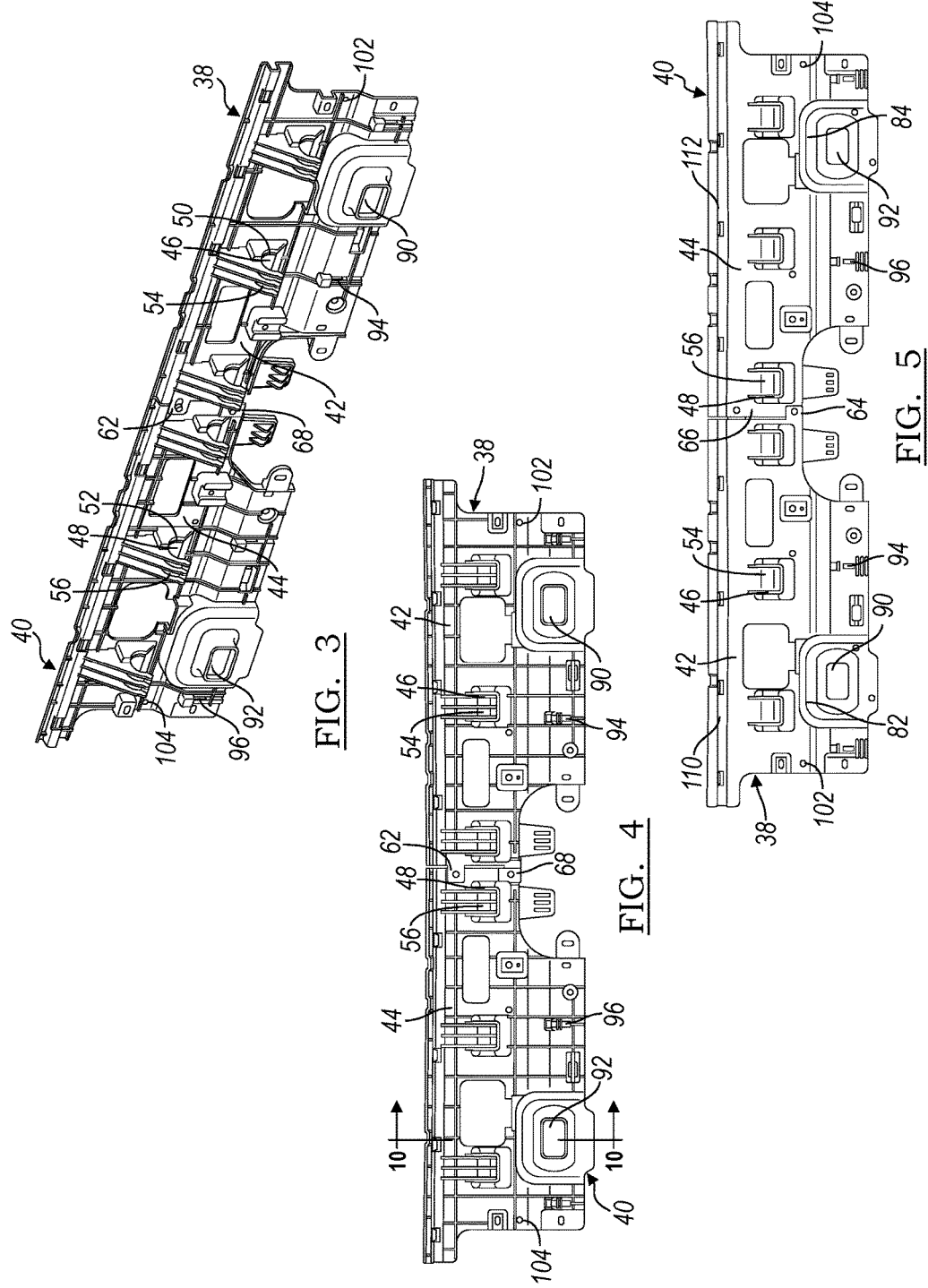

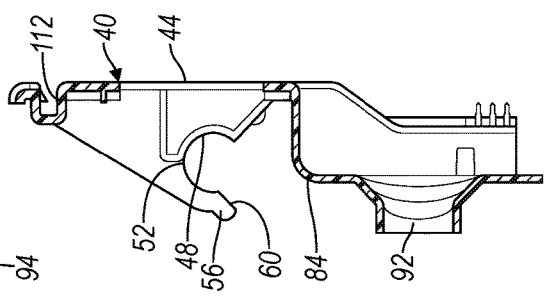
FIG. 10
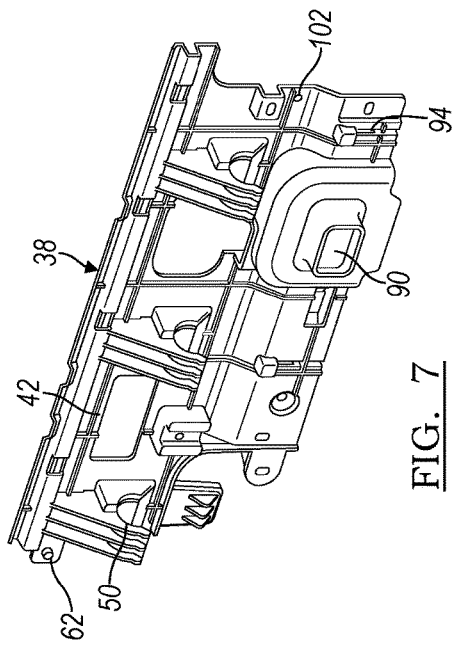
FIG. 7
FIG. 9
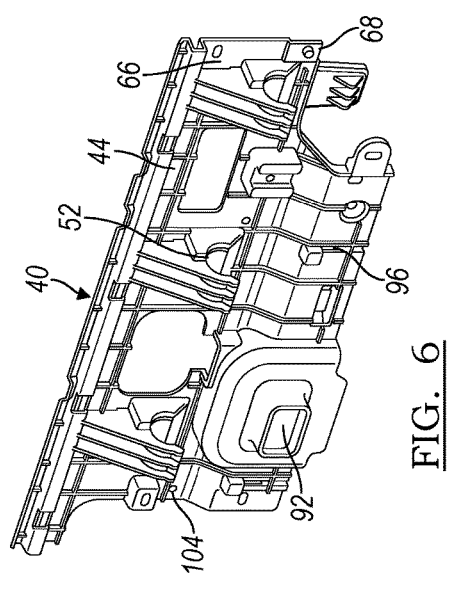
FIG. 6
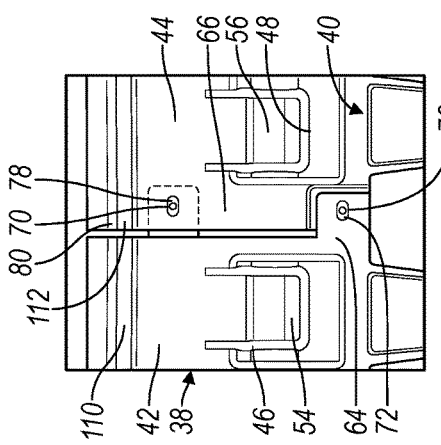
FIG. 8

SEAT TRIM MEMBERS, SEAT TRIM ASSEMBLIES, AND SEAT ASSEMBLIES

TECHNICAL FIELD

Various embodiments relate to seat trim components.

BACKGROUND

Seat assemblies are often formed of various structural components and arrangements, such as welded steel frames, reinforced with molded polymeric trim components, and padded with cushioning, and various combinations of these components.

SUMMARY

According to at least one embodiment, a first seat trim member is sized to be received upon a cross member of a seat back frame. The first seat trim member is sized to support a portion of a back of an occupant. The first seat trim member includes a first fastener arrangement sized to engage a second fastener arrangement of a second seat trim member. The first fastener arrangement is oriented so that the first seat trim member can only be assembled to the cross member at an angle relative to the second seat trim member that is radially offset about the cross member from a fully assembled orientation.

According to at least another embodiment, a seat trim assembly includes a first seat trim member is sized to be received upon a cross member of a seat back frame. The first seat trim member is sized to support a portion of a back of an occupant. The first seat trim member includes a first fastener arrangement sized to engage a second fastener arrangement of a second seat trim member. The first fastener arrangement is oriented so that the first seat trim member can only be assembled to the cross member at an angle relative to the second seat trim member that is radially offset about the cross member from a fully assembled orientation. A second seat trim member is sized to be received upon the cross member of the seat back frame. The second seat trim member is sized to support a portion of a back of an occupant. The second seat trim member includes a second fastener arrangement sized to engage the first fastener arrangement. The second fastener arrangement is oriented so that the second seat trim member can only be assembled to the cross member at an angle relative to the first seat trim member that is radially offset about the cross member from a fully assembled orientation.

According to at least another embodiment, a method for assembling a seat assembly provides a seat back frame with a cross member. A first seat trim member is assembled to the cross member. The first seat trim member is sized to support a portion of a back of an occupant. The first seat trim member includes a first fastener arrangement sized to engage a second fastener arrangement of a second seat trim member. The first fastener arrangement is oriented so that the first seat trim member can only be assembled to the cross member at an angle relative to the second seat trim member that is radially offset about the cross member from a fully assembled orientation. A second seat trim member is assembled to the cross member. The second seat trim member is sized to support a portion of a back of an occupant. The second seat trim member includes a second fastener arrangement sized to engage the first fastener arrangement. The second fastener arrangement is oriented so that the second seat trim member can only be assembled to the cross member at an angle relative to the first seat trim member that is radially offset about the cross member from a fully assembled orientation. At least one of the first seat trim member and the second seat trim member is pivoted into engagement with the other. The first seat trim member is assembled to the second seat trim member.

According to at least another embodiment, a seat assembly is provided with a seat back frame with a cross member. A first seat trim member is sized to be received upon the cross member. The first seat trim member is sized to support a portion of a back of an occupant. The first seat trim member includes a first fastener member. A second seat trim member is sized to be received upon the cross member. The second seat trim member is generally symmetrical to the first seat trim member. The second seat trim member is sized to support a portion of a back of an occupant. The second seat trim member includes a second fastener member to engage the first fastener member to fasten the second seat trim member to the first seat trim member.

BRIEF DESCRIPTION OF THE DRAWINGS

FIG. 3 is a rear perspective view of a seat trim assembly of the seat assembly of FIG. 1;

FIG. 4 is a rear elevation view of the seat trim assembly of FIG. 3;

FIG. 5 is a front elevation view of the seat trim assembly of FIG. 3;

FIG. 6 a rear perspective view of a seat trim member of the seat trim assembly of FIG. 3;

FIG. 7 is a rear perspective view of another seat trim member of the seat trim assembly of FIG. 3;

FIG. 8 is a rear perspective view of the seat trim assembly of FIG. 3, illustrated during an assembly operation;

FIG. 9 is an enlarged front elevation view of the seat trim assembly of FIG. 3; and FIG. 10 is a section view of the seat trim assembly taken along section line 10-10 in FIG. 4.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
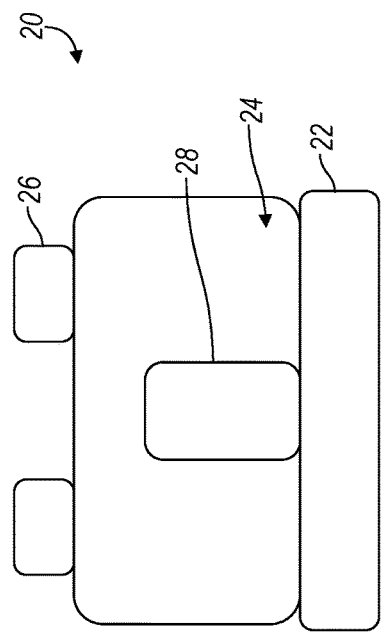
FIG. 1 is a front schematic view of a seat assembly according to an embodiment.

With reference now to FIG. 1, a seat assembly is illustrated schematically and referenced by numeral 20. The seat assembly 20 is depicted as a rear seat assembly 20 or bench seat assembly 20 of a vehicle, such as an automobile. Of course, any seat assembly 20 is contemplated. For the depicted embodiment, the seat assembly 20 includes a seat bench bottom 22 that is adapted to be mounted to a vehicle body. The seat bench bottom 22 is sized to seat up to three occupants. The seat assembly 20 also includes a seat bench back assembly 24 that extends upright from the seat bench bottom 22. The seat assembly 20 may include a plurality of head restraints 26 provided upon the seat back assembly 24. The seat assembly 20 may also include an armrest 28 within the seat back assembly 24.

Figure 2:
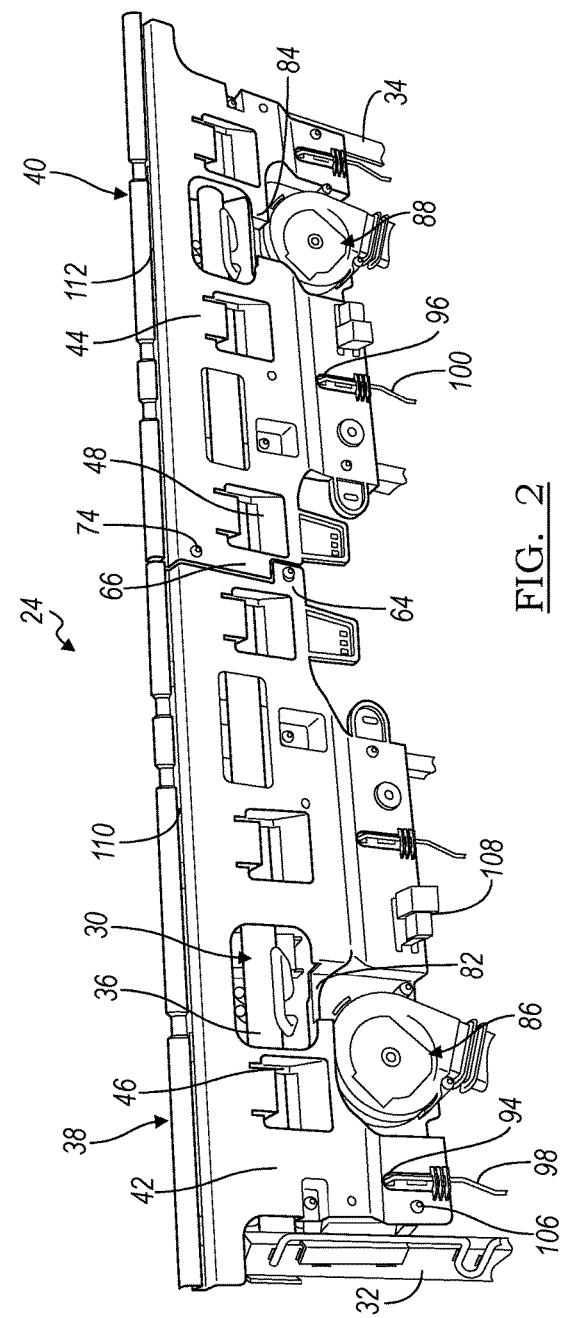
FIG. 2 is a fragmentary front perspective view of the seat assembly of FIG. 1.

The seat back assembly 24 is illustrated in FIG. 2 with a cover and cushioning removed to reveal the underlying structural and function components. The seat back assembly 24 includes a seat back frame 30, which includes a pair of side members 32, 34 that are interconnected by an upper cross member 36. The seat back frame 30 may be formed from welded components as is known in the art. The upper cross member 36 may formed generally tubular with a round cross section. This configuration may reduce manufacturing costs by employing a stock material size. The upper cross member 36 is also sized for modularity in assembling associated components for a particular seating application such as the seat assembly 20.

The seat back assembly 24 also includes a pair of upper seat trim boards 38, 40, which are illustrated in FIGS. 2-9. The upper seat trim boards 38, 40 are designed for a specific seat application of the seat assembly 20. The upper seat trim boards 38, 40 are designed to be mounted on the seat back frame 30 for providing additional structural support to a seated occupant as depicted in FIG. 2. The upper seat trim boards 38, 40 also provide structural and functional support to other seating components of the seat assembly 20.

With reference to FIGS. 2-10, the upper seat trim boards 38, 40 each have a body formed generally as a substrate 42, 44 to provide a generally flat seating support surface to an upper portion of a back of an occupant. The upper seat trim boards 38, 40 are mounted to the upper cross member 36 of the seat back frame 30 as demonstrated in FIG. 2. The upper trim boards 38, 40 each include a series of receptacles 46, 48 formed along the substrates 42, 44 to connect the upper trim boards 38, 40 to the upper cross member 36. Each series of receptacles 46, 48 collectively provide a generally arcuate channel to mount upon the upper cross member 36.

Each of the receptacles 46, 48 include a curved portion 50, 52 sized to mount to the upper cross member 36. The curved portions 50, 52 of the receptacles 46, 48 permit adjustment upon the upper cross member 36. The curved portions 50, 52 may exceed one hundred and eighty degrees to partially enclose the upper cross member 36 to provide an interference fit upon the upper cross member 36.

A series of retention clips 54, 56 extend from each substrate 42, 44 aligned with the receptacles 46, 48. The curved portions 50, 52 extend partially through the retention clips 54, 56 as illustrated in FIG. 10. Each retention clip 54, 56 also includes a leading edge 60 to facilitate alignment with the upper cross member 36 during assembly of the upper seat trim boards 38, 40 to the upper cross member 36.

The first upper trim board 38 includes a pair of brackets 62, 64 as depicted in FIGS. 2-5 and 7-9. The pair of brackets 62, 64 extends laterally from one side of the first upper trim board 38. Each of the pair of brackets 62, 64 is spaced apart from the other, in an upright direction of the seat back assembly 24. Each of the pair of brackets 62, 64 is also spaced apart from the other in a fore-aft direction. For example the upper bracket 62 of the upper trim board 38 is offset rearward relative to the lower bracket 64.

The second upper trim board 40 also includes a second pair of brackets 66, 68, which are depicted in FIGS. 2-6, 8 and 9. The second pair of brackets 66, 68 extends laterally from one side of the second upper trim board 40 to engage the first pair of brackets 62, 64 of the first upper trim board 38. The second pair of brackets 66, 68 may be connected as depicted. Each of the second pair of brackets 66, 68 are also offset in a fore-aft direction so that the upper bracket 66 is forward of the lower bracket 68. The offset arrangement of the second pair of brackets 66, 68 corresponds to that of the first pair of brackets 62, 64.

Referring now to FIG. 8, the upper trim boards 38, 40 are each assembled to the upper cross member 36 of the seat assembly 20 at radial orientations about the upper cross member 36 that are out of alignment, or offset radially, from a fully assembled orientation as that shown in FIG. 2. The offset radial orientations of the upper trim boards 38, 40 prevent interference of the brackets 62, 64, 66, 68 during assembly. The spacing of the brackets 62, 64 of the first upper trim board 38 provide clearance for the connected brackets 66, 68 of the second upper trim board 40. These arrangements permit the first upper trim board 38 and the second upper trim board 40 to be assembled to the upper cross member 36 separately.

After both of the upper trim boards 38, 40 are mounted to the upper cross member 36, the upper trim boards 38, 40 are pivoted into engagement with each other as depicted in FIGS. 2-5 and 9. The forward facing upper bracket 62 of the first upper trim board 38 engages the rearward facing upper bracket 66 of the second upper trim board 40. Likewise, the forward facing lower bracket 68 of the second upper trim board 40 engages the rearward facing lower bracket 64 of the first upper trim board 38.

The forward facing upper bracket 62 of the first upper trim board 38 and the forward facing lower bracket 68 of the second upper trim board 40 each include a through aperture 70, 72 as illustrated in FIG. 9 to receive threaded fasteners 74 as illustrated in FIG. 2. The rearward facing lower bracket 64 of the first upper trim board 38 and the rearward facing upper bracket 66 of the second upper trim board 40 each include a slotted through aperture 76, 78 as illustrated in FIG. 9 to also receive the threaded fasteners 74 to fasten the brackets 62, 64, 66, 68, and consequently the upper trim boards 38, 40 together.

The upper trim boards 38, 40 allow for control of tolerance variations in a lateral direction with a slotted fastener configuration provided by the slotted through apertures 76, 78 in fastened engagement with the through apertures 70, 72. The tolerance permits a split 80, (FIG. 9), such as three millimeters, between the assembled upper trim boards 38, 40.

The second upper trim board 40 is generally symmetrical to the first seat trim board 38, except for the brackets 66, 68. With reference again to FIG. 2, the assembled upper trim boards 38, 40 create a sharp upper trim line in the vehicle seat assembly 20. Referring now to FIGS. 2-10, the upper trim boards 38, 40 each include a receptacle 82, 84 for receipt of a climate control unit 86, 88. Each upper trim board 38, 40 is provided with a funnel-shaped nozzle 90, 92 on an opposed surface of the trim board 38, 40 for air ingress from a vehicle inner cabin through an upper 'A' surface of the trimmed seat assembly 20 into the climate control units 86, 88.

The upper trim boards 38, 40 each include a pair of slot and aperture configurations 94, 96 for receipt of upper suspension wires 98, 100 for a suspension for the seat assembly 20. The upper trim boards 38, 40 include additional through apertures 102, 104 for receiving threaded fasteners 106 to connect the upper trim boards 38, 40 to the various upright members of the seat back frame 30, including the upright side members 32, 34. The upper trim boards 38, 40 also support electrical connectors 108 for various functional components of the seating arrangement. The upper trim boards 38, 40 each include a groove 110, 112 for receiving a trim cover (not shown) that is attached to the seat assembly 20.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat trim assembly comprising:
    a first seat trim member sized to be received upon a cross member of a seat back frame, the first seat trim member being sized to support a portion of a back of an occupant, the first seat trim member comprising a first fastener arrangement sized to engage a second fastener arrangement of a second seat trim member, wherein the first fastener arrangement is oriented so that the first seat trim member can only be assembled to the cross member at an angle relative to the second seat trim member that is radially offset about the cross member from a fully assembled orientation; and
    a second seat trim member sized to be received upon the cross member of the seat back frame, the second seat trim member being sized to support a portion of a back of an occupant, the second seat trim member comprising a second fastener arrangement sized to engage the first fastener arrangement, wherein the second fastener arrangement is oriented so that the second seat trim member can only be assembled to the cross member at an angle relative to the first seat trim member that is radially offset about the cross member from a fully assembled orientation;
    wherein the first seat trim member comprises:
        a laterally extending first upper bracket, and
        a laterally extending first lower bracket, spaced apart in an upright direction and spaced apart in a fore-aft direction from the first upper bracket; and
    wherein the second seat trim member comprises:
        a laterally extending second upper bracket, and
        a laterally extending second lower bracket, spaced apart in an upright direction and spaced apart in a fore-aft direction from the second upper bracket, such that the first seat trim member and the second seat trim member are assembled to the cross member at radial orientations about the cross member that are offset radially from a fully assembled orientation to prevent interference of the first and second upper brackets and the first and second lower brackets during assembly.

2. The seat trim assembly of claim 1 wherein a first channel is formed therein sized to receive the cross member; and
    wherein the first channel has a cross section that is at least partially round.

3. The seat trim assembly of claim 2 wherein the first seat trim member comprises a first series of retention clips collectively defining the first channel; and
    wherein the first series of retention clips comprise a curved portion to receive the cross member and a leading portion to align the first seat trim member during assembly upon the cross member.

4. The seat trim assembly of claim 2 further comprising a series of receptacles formed along the first seat trim member to collectively define the first channel.

5. The seat trim assembly of claim 2 wherein the partially round cross section of the first channel exceeds one hundred and eighty degrees to partially enclose the cross member and to provide an interference fit upon the cross member.

6. The seat trim assembly of claim 1 wherein the first fastener arrangement comprises a first bracket;
    wherein a first aperture is formed through the first bracket; and
    wherein the first aperture is slotted laterally to accommodate tolerance variations of the seat back frame, the first seat trim member and a second seat trim member.

7. A method to assemble a seat assembly, the method comprising:
    providing a seat back frame with a cross member;
    assembling the first seat trim assembly according to claim 1 on the cross member;
    assembling the second seat trim member on the cross member;
    pivoting at least one of the first seat trim member and the second seat trim member into engagement with the other; and
    fastening the first seat trim member to the second seat trim member.

* * * * *